Figure 1:
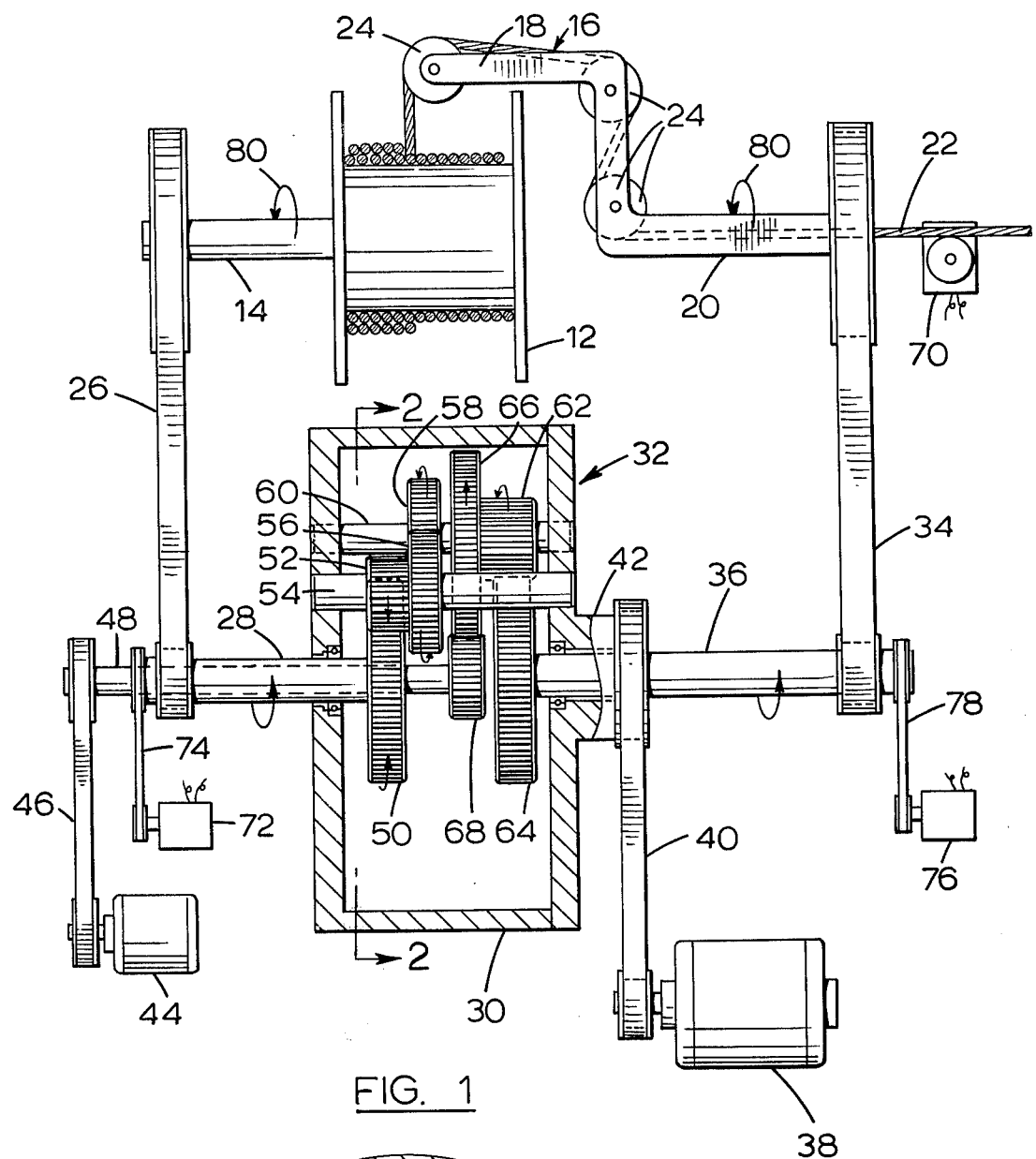

United States Patent [19]
Richardson

[11] 3,926,072
[45] Dec. 16, 1975

[54] PLANETARY DIFFERENTIAL TRANSMISSION

[75] Inventor: Walter Lorne Richardson, Pointe Claire, Canada

[73] Assignee: Northern Eelectric Company Limited,, Montreal, Canada

[22] Filed: Oct. 24, 1974

[21] Appl. No.: 517,496

[52] U.S. Cl. ......... 74/665 N; 74/665 L; 74/665 GA; 74/665 F; 57/102; 57/71; 57/96
[51] Int. Cl.² ..................... F16H 37/06; 7/24 07/24; D01H 13/00
[58] Field of Search........... 74/665 L, 665 N, 665 P, 74/665 GA, 665 F; 254/186 R; 57/67, 71, 93, 94, 96, 102

[56] References Cited
UNITED STATES PATENTS

| | | | |
|---|---|---|---|
| 2,338,848 | 1/1944 | Henning et al. | 57/71 |
| 2,675,716 | 4/1954 | Harlow et al. | 74/665 N |
| 2,905,069 | 9/1959 | Ayres et al. | 74/665 N X |
| 3,056,314 | 10/1962 | Eichler et al. | 74/665 N X |
| 3,301,093 | 1/1967 | Ewert | 74/665 N |
| 3,561,544 | 2/1971 | Farmer | 74/665 GA |

FOREIGN PATENTS OR APPLICATIONS

| | | | |
|---|---|---|---|
| 1,110,711 | 7/1961 | Germany | 254/186 |

Primary Examiner—Samuel Scott
Assistant Examiner—P. S. Lall

[57] ABSTRACT

A drive mechanism for a cable stranding machine having a rotatable take-up reel and a flyer rotatable concentrically about the reel, in which separate drive shafts connectable with the reel and the flyer are coaxial and coupled by a differential transmission driven from a single power source. Variations in the relative rotations of the drive shafts are effected by engaging the transfer gears of the transmission with an auxiliary drive.

9 Claims, 2 Drawing Figures

PLANETARY DIFFERENTIAL TRANSMISSION

This invention relates to a differential transmission for use in a cable stranding or bunching machine.

In the production of electric cables a plurality of wire strands are twisted together and the resultant cable is wound on a take-up reel by passing the cable through a flyer which rotates concentrically with the reel. Both the reel and the flyer rotate and the difference in rotational speed between the two rotating elements determines the amount of cable which is taken up by the reel as it rotates. The rotation of the flyer determines the twist which is imparted to the cable.

In some cases the reel and the flyer are independently motor driven. If the reel is travelling faster than the flyer, the flyer motor will act as a generator because the cable linkage between the two elements acts as a mechanical coupling and the torque delivered by the reel is received or resisted by the flyer (neglecting friction). Although part of the power required by the reel motor is recovered by the regenerative effect of the flyer motor, the relative speeds of the two motors require intricate and extensive controls during acceleration to maintain a constant lay or twist.

To compensate for the varying diameter of the lay as the cable is wound onto the take-up reel the speed of the reel must be increased or decreased (depending on whether the reel is overdriven or underdriven with respect to the flyer) to keep the tension constant on the cable. Cable stranders or bunchers presently in use employ variable pitch sheaves to control the speed of the take-up reel. Because of heavy torques created by the "coupling" between the reel and the flyer, variable pitch sheaves wear rapidly and slippage results in an incorrect lay.

It is an object of the present invention to provide an improved device for driving a cable stranding machine.

In its broadest aspect the invention resides in a drive mechanism for a cable stranding machine having a rotatable take-up reel and a flyer rotatable concentrically about the reel, comprising: a first drive shaft connectable with the reel; a second drive shaft connectable with the flyer and coaxial with the first drive shaft; differential transmission means coupling the first and second drive shafts, the transmission means comprising a housing journally mounted on said first and second drive shafts and gear means interengaging said shafts; first drive means rotating the housing; and second drive means engaging the gear means whereby the relative rotation of the first and second drive shafts is variably controllable.

Figure 2:
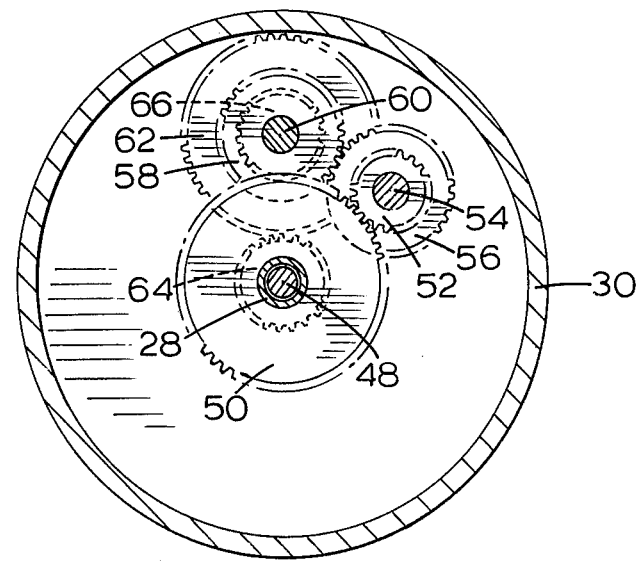

An example embodiment of the invention is shown in the accompanying drawings in which:

FIG. 1 is an elevational view, partly in cross-section, showing a cable stranding device: and FIG. 2 is a cross-sectional view taken along line 2—2 of FIG. 1.

The example embodiment shown in the drawings consists of a cable stranding machine 10 having a reel 12 removably mounted on an axial shaft 14 and a flyer 16 rotatable concentrically about reel 12. Flyer 16 comprises a cantilever arm 18 integral with a shaft 20 which is coaxial with shaft 14 of reel 12. A cable 22 fed coaxially along axle 20 is guided by a series of pulleys 24 onto reel 12. Pulleys 24 are mounted for free rotation on arm 18.

Shaft 14 of reel 12 is driven by a belt 26 from a tubular first drive shaft 28 which extends into a housing 30 of a differential transmission 32. Shaft 20 of flyer 16 is driven by a belt 34 from a second drive shaft 36 which is coaxial with drive shaft 28 and which also extends into housing 30. Housing 30 is journally mounted on both drive shafts 28 and 36.

A main electric drive motor 38 is connected by a belt 40 with a boss 42 integral with housing 30 and concentric with drive shaft 36. An auxiliary electric drive or lay motor 44 is connected by a belt 46 with a third drive shaft 48 which passes coaxially through tubular drive shaft 28 into housing 30.

Within housing 30 of transmission 32, drive shaft 28 of reel 12 carries a first keyed sun gear 50 which meshes with a plurality of first planetary gears 52 each keyed on a separate first bearing shaft 54 journally mounted on housing 30. For clarity of description only one gear 52 and one shaft 54 are shown in the drawings but three such gears and shafts are preferred. Each shaft 54 also carries a keyed first transfer gear 56 which meshes with a second transfer gear 58 keyed on a second bearing shaft 60 journally mounted on housing 30. As before, only one gear 58 and one shaft 60 are shown in the drawings but three such gears and shafts are preferred.

A second planetary gear 62 is keyed on each shaft 60 and meshes with a second sun gear 64 which is keyed on drive shaft 36 of flyer 16. A third planetary gear 66 is keyed on each shaft 60 and meshes with a third sun gear 68 which is keyed on drive shaft 48.

A tachometer 70 is mounted for actuation by cable 22, a tachometer 72 is connected by a belt 74 with first drive shaft 28, and a tachometer 76 is connected by a belt 78 with second drive shaft 36.

In the operation of the device, cable 22 is threaded over pulleys 24 of flyer 16 and the end of the cable is attached to reel 12. Reel 12 and flyer 16 are then caused to rotate, in the same direction as indicated by arrows 80, by actuating main drive motor 38 which rotates housing 30 of transmission 32. As reel 12 rotates it is moved axially by a transverse mechanism (not shown) in a direction of arrows 82.

In the absence of any unbalancing torque applied to the gear system in housing 30, both drive shafts 28 and 36 will rotated at the same speed as housing 30 and consequently reel 12 and flyer 16 will rotate in unison. To vary the relative speeds of reel 12 and flyer 16, lay motor 44 is actuated to apply torque through shaft 48 to sun gear 68 which transmits the torque through planetary gears 66 to shafts 28 and 36: planetary gears 62 transmit the torque to sun gear 64 while transfer gears 58 transmit the torque through transfer gears 56 and planetary gear 52 to sun gear 50. Since there is an additional transfer gear 56 interposed between planetary gears 66 and sun gear 50, sun gears 50 and 64 will rotate in opposite directions (relative to housing 30), causing reel drive shaft 28 to rotate at a different speed than flyer drive shaft 36 but in the same direction.

Tachometer 70, 72 and 76 record the speeds of cable 22, reel 12 and flyer 16 respectively. Lay motor 44 enables reel 12 to be driven faster (overdriven) or slower (underdriven) than flyer 16 and the lay of cable 22 on reel 12 is wound in one direction or the other accordingly. FIG. 1 shows reel 12 overdriven.

It will be appreciated that the present invention permits the replacement of the two independent motors of a conventional stranding machine, one driving reel 12 and the other driving flyer 16, by a single motor 38 driving differential transmission 32 and a light auxiliary lay motor 44, thus effecting considerable savings in the capital cost and maintenance of the larger motors and in power costs, especially where larger reels are employed.

I claim:

1. A drive mechanism for a cable stranding machine having a rotatable take-up reel and a flyer rotatable concentrically about the reel, comprising:

A first drive shaft connectable with the reel;

A second drive shaft connectable with the flyer and coaxial with the first drive shaft;

differential transmission means coupling the first and second drive shafts, the transmission means comprising a housing journally mounted on said first and second drive shafts and gear means interengaging said shafts;

first drive means rotating the housing; and second drive means engaging the gear means whereby the relative rotation of the first and second drive shafts is variably controllable.

2. A drive mechanism as claimed in claim 1 in which the gear means comprises a first gear keyed on the first drive shaft, a second gear keyed on the second drive shaft, and a plurality of transfer gears journally mounted on the housing and meshing with said first and second gears.

3. A drive mechanism as claimed in claim 2 in which the second drive means includes a third drive shaft having a third gear keyed thereon within the housing and meshing with at least one of the transfer gears.

4. A drive mechanism as claimed in claim 3 in which the first drive shaft is tubular and the third drive shaft extends coaxially therethrough.

5. A drive mechanism as claimed in claim 1 in which the gear means comprises:

a first sun gear keyed on the first drum shaft;

a second sun gear keyed on the second drive shaft;

a plurality of transfer gears journally mounted on the housing, said transfer gears comprising a first planetary gear keyed on a first bearing shaft journally mounted on the housing and meshing with the first sun gear, a first transfer gear keyed on the first bearing shaft, a second transfer gear keyed on a second bearing shaft journally mounted on the housing and meshing with the first transfer gear, and a second planetary gear keyed on the second bearing shaft and meshing with the second sun gear.

6. A drive mechanism as claimed in claim 5 in which the second drive means includes a third drive shaft having a third sun gear keyed thereon within the housing, the second bearing shaft having a third transfer gear keyed thereon and meshing with the third sun gear.

7. A drive mechanism as claimed in claim 6 in which the first drive shaft is tubular and the third drive shaft extends coaxially therethrough.

8. A drive mechanism as claimed in claim 5 in which three of said first bearing shafts are journally mounted on the housing, each of said first bearing shaft carrying a first planetary gear and a first transfer gear, and three of said second bearing shafts are journally mounted on the housing, each of said second bearing shafts carrying a second transfer gear and a second planetary gear.

9. A drive mechanism as claimed in claim 6 in which the first drive shaft is tubular and the second drive means includes a third drive shaft extending coaxially through the first drive shaft, a third sun gear keyed on the third drive shaft with the housing, each second bearing shaft having a third transfer gear keyed thereon and meshing with the third sun gear.

* * * * *